Dec. 8, 1970     P. H. SMITH     3,546,699

SCANNING ANTENNA SYSTEM

Filed Dec. 19, 1960     2 Sheets-Sheet 1

INVENTOR
P. H. SMITH
BY
Ralph T. Holcomb
ATTORNEY

Dec. 8, 1970

P. H. SMITH 3,546,699

SCANNING ANTENNA SYSTEM

Filed Dec. 19, 1960

INVENTOR
P. H. SMITH

BY

*Ralph T. Holcomb*
ATTORNEY

United States Patent Office 3,546,699
Patented Dec. 8, 1970

3,546,699
SCANNING ANTENNA SYSTEM
Phillip H. Smith, Summit, N.J., assignor to Bell Telephone Laboratories, Incorporated, New York, N.Y., a corporation of New York
Filed Dec. 19, 1960, Ser. No. 76,974
Int. Cl. H04b 7/00; H01q 3/02
U.S. Cl. 343—100     8 Claims This invention relates to antenna systems and more particularly to a scanning antenna.

An object of the invention is to produce a fan-shaped beam of electromagnetic energy which may be rotated to scan an entire hemisphere. A further object is to increase the power radiated by such a beam. Other objects are to lighten and simplify the mechanical structure of a scanning antenna with unlimited angular freedom.

An antenna system with a narrow fan beam may be provided by a linear array of electromagnetic radiators. For scanning, the direction of the beam may be changed electrically by changing the phase relationship between the radiators, or mechanically by rotating the entire system. If phase control is used, the permissible angular rotation is greatly limited. If mechanical rotation is used, the scanning rate is limited due to the size and weight of the structure.

In the scanning antenna system in accordance with the present invention, mechanical rotation is used, so that there is no angular limitation. However, the primary sources of radiation remain fixed, thus reducing the weight and size of the rotating structure and permitting a faster rate of scan. Also, since they are fixed, a plurality of primary sources may be used in the array, thus greatly increasing the radiated power.

In each of the two embodiments shown, by way of example only, a plurality of fixed primary sources of in-phase electromagnetic energy are arrayed on one side of a circular air gap. Three rotatable transducers having a matching circular input contour are positioned on the other side of the air gap. Each transducer has a linear output contour and transmission properties such that all of its output energy is in phase. Means are provided for rotating the transducer in the plane of the circle of the air gap about its center. In one embodiment, the sources are positioned outside of the circle and the transducers inside. In the other, the sources are inside the circle and the transducers outside. In both examples, the sources connect through wave guides to rotary-gap emitter horns adjacently arrayed around the air gap on one side thereof. The sections have the same length, so that the phase shifts therein are the same.

Each of the transducers comprises a plurality of rotatable receptor horns arrayed in a 120-degree arc on the other side of the air gap, and a corresponding number of rotatable radiating horns forming a linear array. Each of the horns in one set is connected to the corresponding horn in the other set by a section of wave guide. All of these sections are of the same length and have the same phase shift. Therefore, all of the energy radiated from the linear array is in phase, and a fan-shaped beam is produced. Means are provided for rotating the three transducers together as a unit, thus causing the three associated beams to rotate in a fixed relationship to each other.

The nature of the invention and its various objects, features, advantages will appear more fully in the following detailed description of the typical embodiments illustrated in the accompanying drawing, of which FIG. 1 is a plan view of one embodiment of a scanning antenna in accordance with the invention;

Figure 1:
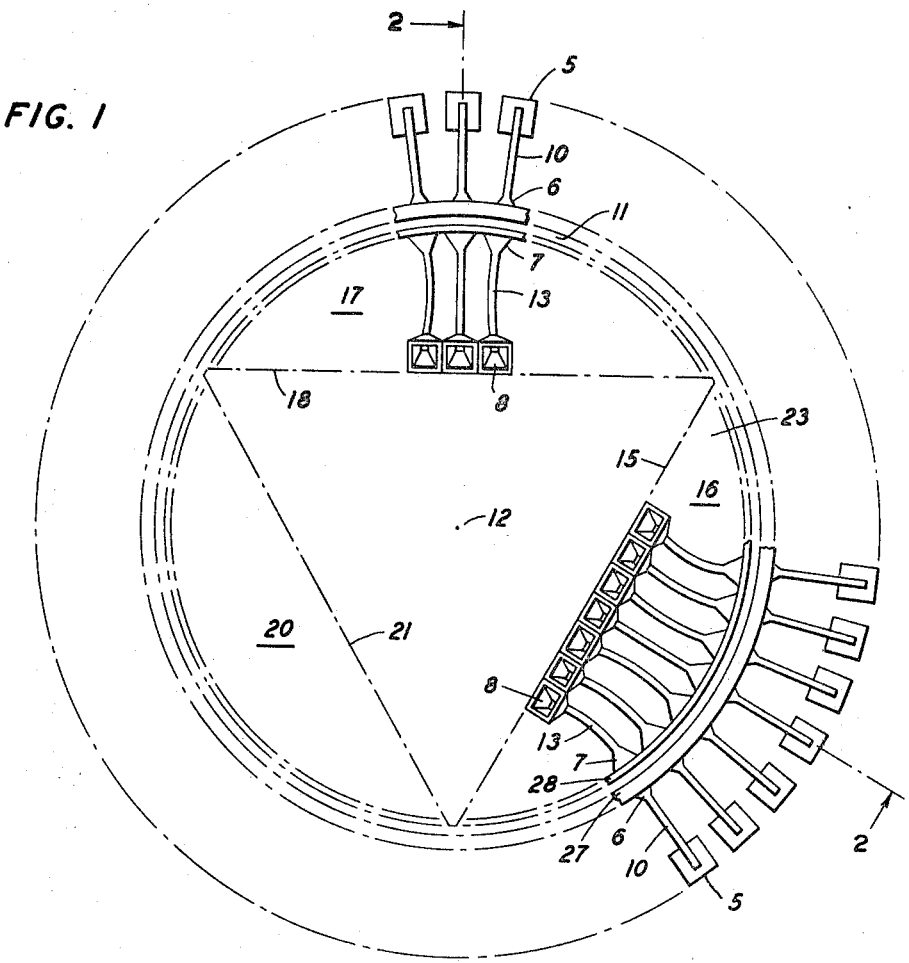
Figure 2:
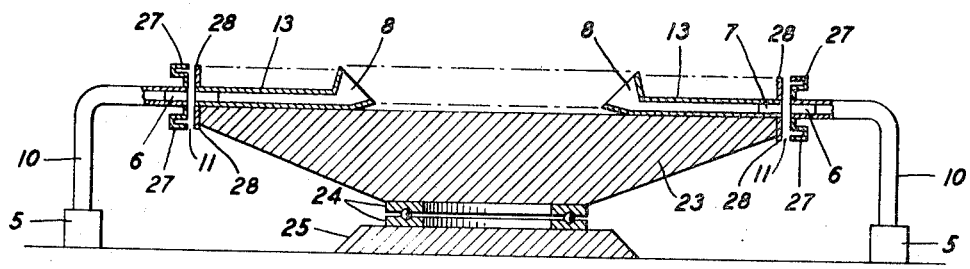
FIG. 2 is a sectional side view of the structure of FIG. 1 taken along the line 2—2 in the direction of the arrows.

The scanning antenna shown in FIGS. 1 and 2 comprises a plurality of primary sources of in-phase electromagnetic energy 5, a corresponding number of rotary-joint emitter horns 6, a like number of rotatable receptor horns 7, and also an equal number of rotatable radiating horns 8. Each of the horns 5 is connected to a corresponding horn 6 through a section of wave guide 10. All of the sections 10 are of the same length and have the same phase shift. Thus, all of the energy emitted from the horns 6 is in phase. The horns 6 are adjacently arrayed around the outside of a circular air gap 11 having its center at the point 12.

Each of the horns 7 is connected to the corresponding horn 8 by a section of wave guide 13. All of the sections 13 have the same length and phase shift, so that all of the energy radiated by the horns 8 is in phase. The horns 7 are adjacently arrayed on the inside of the circle of the air gap 11. One-third of the horns 7, covering an arc of approximately 120 degrees, are connected to a third of the horns 8 arranged along the straight line 15 to form a linear array. These elements constitute the transducer 16. Another third of the horns 7 are connected to another third of the horns 8 to form a second transducer 17 with a linear output contour 18. The remaining horns 7 are connected to the rest of the horns 8 to constitute a third transducer 20 with a linear output contour 21. The transducers 16, 17, and 20 are supported by a rotor 23 which rests on bearings 24 carried by a fixed base 25. The rotor 23 is rotated about the center 12 by means not shown.

The horns 8 have a double flare and are tipped upward at an angle of 45 degrees from the horizontal. The horns 6 and 7 are flared in only the direction of the narrower transverse dimension of the connecting wave guide. The flares of the horns 6 terminate in the continuous, annular wave traps 27. The flares of the horns 7 terminate in the annular flanges 28 which oppose the wave traps 27.

Although the wave guides 13 are all of the same length, the distances between each of the horns 7 and the associated horn 8 become less as the ends of the linear array are approached. Therefore, the guides 13 must be convoluted more and more as their distance from the center of the transducer increases.

The antenna shown in FIGS. 1 and 2 operates as follows. In-phase energy from the fixed primary sources 5 propagates along the wave guides 10 to the fixed emitter horns 6 which supply in-phase energy to the outer side of the air gap 11. The energy is picked up on the inner side of the gap 11 by the rotatable receptor horns 7, propagated through the wave guides 13, and radiated from the horns 8, still in phase. The three linear arrays, along the lines 15, 18, and 21, radiate three narrow fan beams. Each of these beams has a constant, narrow azimuthal arc, an arc of about 80 degrees in the vertical direction (in elevation), and an axis which makes an angle of 45 degrees with the horizontal. The beams are spaced from each other by azimuthal angles of 120 degrees. Each beam makes one rotation for each rotation of the rotor 23, so that the scanning rate is three times the rotational rate of the rotor.

Figure 3:
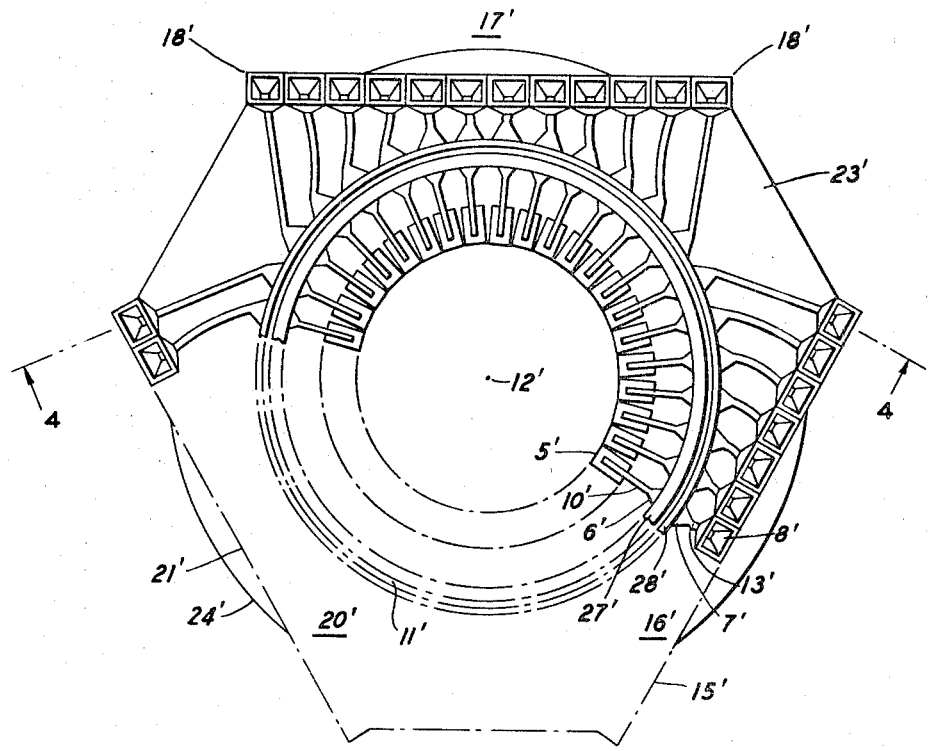
FIG. 3 is a plan view of a second embodiment of the invention, in which the primary sources are on the inner side of the circle of the air gap instead of on the outer side.
Figure 4:
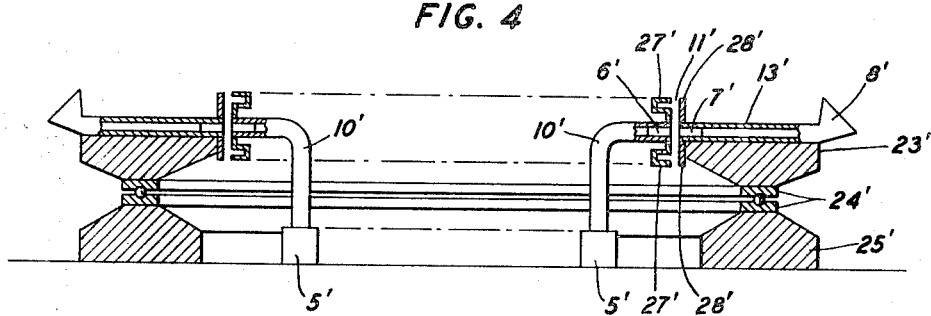
FIG. 4 is a sectional side view of the structure of FIG. 3 taken along the line 4—4 in the direction of the arrows.

FIGS. 3 and 4 show a second embodiment of the invention, in which the fixed primary sources 5′ are located on the inner side of the circular air gap 11′ and the transducers 16′, 17′, and 20′ on the outer side. Similar elements are given the same number with a prime added.

Each of the sources 5' connects through a wave guide 10' to a rotary-joint emitter horn 6' terminated in the annular wave traps 27'. Each of the rotatable receptor horns 7' is connected by a wave guide 13' to a radiating horn 8'. The annular flanges 28' connect to the flares of the horns 7'. Equal numbers of the horns 8' are positioned along the lines 15', 18', and 21', respectively, to form three linear arrays which are the output contours of the transducers 16', 17', and 20'. Since the guides 13' are all of the same length, they must be convoluted more and more as the center of the transducer is approached. Some of these convolutions are not apparent in FIG. 3. The transducers are supported by the rotor 23' which rests on the bearings 24' carried by the fixed base 25'. The rotor 23' is rotated by means not shown. The horns 8' are tilted up at an angle of 45 degrees with the horizontal. The antenna provides three narrow, equally-spaced, rotatable fan beams of the type described above in connection with FIGS. 1 and 2.

In the interest of simplicity, some of the component elements are omitted in FIGS. 1, 2, 3, and 4, as indicated by the dot-and-dash outlines.

It is to be understood that the above-described arrangements are only illustrative of the application of the principles of the invention. Numerous other arrangements may be devised by those skilled in the art without departing from the spirit and scope of the invention.

What is claimed is:

1. A scanning antenna system comprising a fixed array of separate sources of in-phase electromagnetic energy arranged in the arc of a circle, a transducer having an arcuate input contour matching and adjacent to the arc, a linear output contour, and transmission properties such that all of the output energy radiated by the transducer is in phase, and means for rotating the transducer in the plane of the circle about the center of the circle.

2. A scanning antenna system comprising a plurality of fixed, independent, in-phase sources of electromagnetic energy arranged in a circle, a rotatable transducer adapted to convert the energy from at least a portion of the sources into a linear source of in-phase energy, and means for rotating the transducer in the plane of the circle about the center of the circle.

3. A system in accordance with claim 2 in which the fixed sources are outside of the circle and the transducer is inside of the circle.

4. A system in accordance with claim 2 in which the fixed sources are inside of the circle and the transducer is outside of the circle.

5. A system in accordance with claim 2 which includes a second transducer similar to and rotatable with the first transducer, the second transducer being adapted to convert energy from a second portion of the fixed sources into a second linear source of in-phase energy, and said linear sources being directed in different directions.

6. An antenna system comprising a fixed portion and a rotor, the fixed portion including a plurality of individual sources of in-phase electromagnetic radiation arrayed in a complete circle, the rotor including a plurality of receptor horns arrayed in a circular arc adjacent to the circle but spaced therefrom to form an air gap, a plurality of radiators in a linear array, and a family of equal-length wave guides interconnecting the horns and the radiators.

7. A system in accordance with claim 6 in which the rotor is within the circle.

8. A system in accordance with claim 6 in which the rotor is outside of the circle.

References Cited

UNITED STATES PATENTS

| | | | |
|---|---|---|---|
| 2,466,354 | 4/1949 | Bagnall | 343—100X |
| 3,058,107 | 10/1962 | Danielson | 343—100 |
| 3,264,642 | 8/1966 | Lamberty | 343—100X |

RODNEY D. BENNETT, Primary Examiner

T. H. TUBBESING, Assistant Examiner

U.S. Cl. X.R.

343—758, 762, 766, 776